United States Patent [19]

Jyh-Snyong

[11] Patent Number: 5,261,710
[45] Date of Patent: Nov. 16, 1993

[54] STRUCTURE OF PIPE CONNECTOR

[76] Inventor: Jeon Jyh-Snyong, No. 49-1 Pa-Hsien Road, Chuan-Yin Village, Tong-San Hsiang, I-Lan Hsien, Taiwan

[21] Appl. No.: 928,376

[22] Filed: Aug. 12, 1992

[51] Int. Cl.⁵ .............................................. F16L 21/06
[52] U.S. Cl. ..................... 285/323; 285/328; 285/369; 285/383; 285/915
[58] Field of Search ............... 285/256, 322, 323, 915, 285/328, 369, 383

[56] References Cited

U.S. PATENT DOCUMENTS

| | | | |
|---|---|---|---|
| 2,273,398 | 2/1942 | Couty et al. | 285/259 X |
| 2,449,916 | 9/1948 | Tandet | 285/259 X |
| 2,940,778 | 6/1960 | Kaiser | 285/915 X |
| 3,248,135 | 4/1966 | Meripol | 285/323 |
| 4,258,935 | 3/1981 | Rodrigo et al. | 285/915 X |
| 4,807,911 | 2/1989 | Short | 285/323 |

FOREIGN PATENT DOCUMENTS 133670 3/1946 Australia .................. 285/323

Primary Examiner—Dave W. Arola
Attorney, Agent, or Firm—Lowe, Price, LeBlanc & Becker

[57] ABSTRACT

A pipe connector includes an externally threaded connecting tube having an annular flange around the inside wall thereof on the middle, two pipes respectively inserted into the connecting tube and stopped against the annular flange at two opposite ends, two locknuts respectively threaded onto the connecting tube at two opposite ends to squeeze two tapered split ring against the pipes causing them to be locked in place, and two water seal rings respectively stopped between the connecting tube and the tapered split rings to seal the gaps.

2 Claims, 5 Drawing Sheets

STRUCTURE OF PIPE CONNECTOR

BACKGROUND OF THE INVENTION

The present invention relates to a structure of pipe connector for connecting water pipes together used in carrying high pressure liquids.

A variety of pipe connectors are known and widely in use for connecting pipes together. FIG. 4 illustrates a pipe connector according to the prior art which is simply comprised of a sleeve sleeved onto two end-matched pipes. After connection, an adhesive glue is coated over the connecting, areas to seal the gaps. This pipe connecting method is not suitable for connecting water pipes which are used for carrying high pressure water. FIG. 5 illustrates another pipe connector according to the prior art which is generally comprised of two flanges respectively welded to the pipes to be connected, and the flanges are then fastened together by screw bolts and locknuts to connect the pipes together. Because the flanges are fastened to the pipes to be connected through a welding joint, the welded areas may be damaged easily causing a leakage as the pipes carry high pressure water. FIG. 6 illustrates still another pipe connector according to the prior art in which the pipes have each an outer thread on one end connected to each other by a screw nut through a screw joint. The main disadvantage of the pipe connector of FIG. 6 is that the outer thread on each pipe and the inner thread on the screw nut may be damaged easily, more particularly after a long use. Once the outer thread of either pipe or the inner thread of the screw nut is damaged, the connector should be replaced.

SUMMARY OF THE INVENTION

The present invention eliminates the aforesaid disadvantages. It is therefore an object of the present invention to provide a pipe connector which is suitable for use in connecting pipes together for carrying high pressure liquids. It is another object of the present invention to provide a pipe connector which is easy to assemble and practical for use in water piping repair works. According to the preferred embodiment, the pipe connector is comprised of two locknuts respectively threaded onto a connecting tube at two opposite ends to squeeze two tapered split rings against two pipes to be connected, which are inserted through the locknuts into the connecting tube and stopped against an inward flange on the connecting tube at two opposite ends. Water seal rings are respectively squeezed to deform between the tapered split rings and the connecting tube to seal the gaps.

DETAILED DESCRIPTION OF THE PREFERRED EMBODIMENT

Figure 1:
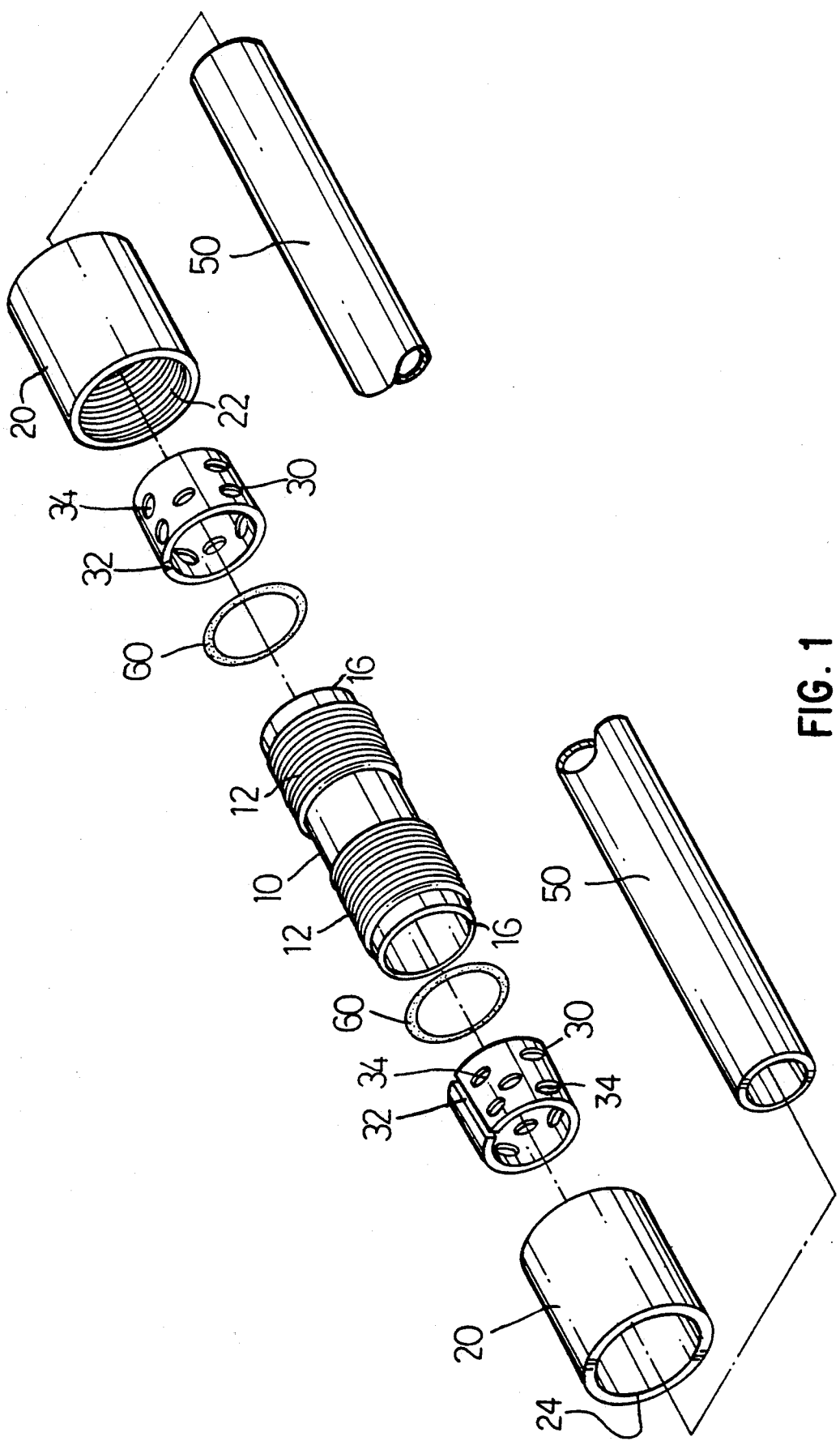
FIG. 1 is an exploded view of a pipe connector embodying the present invention.
Figure 2:
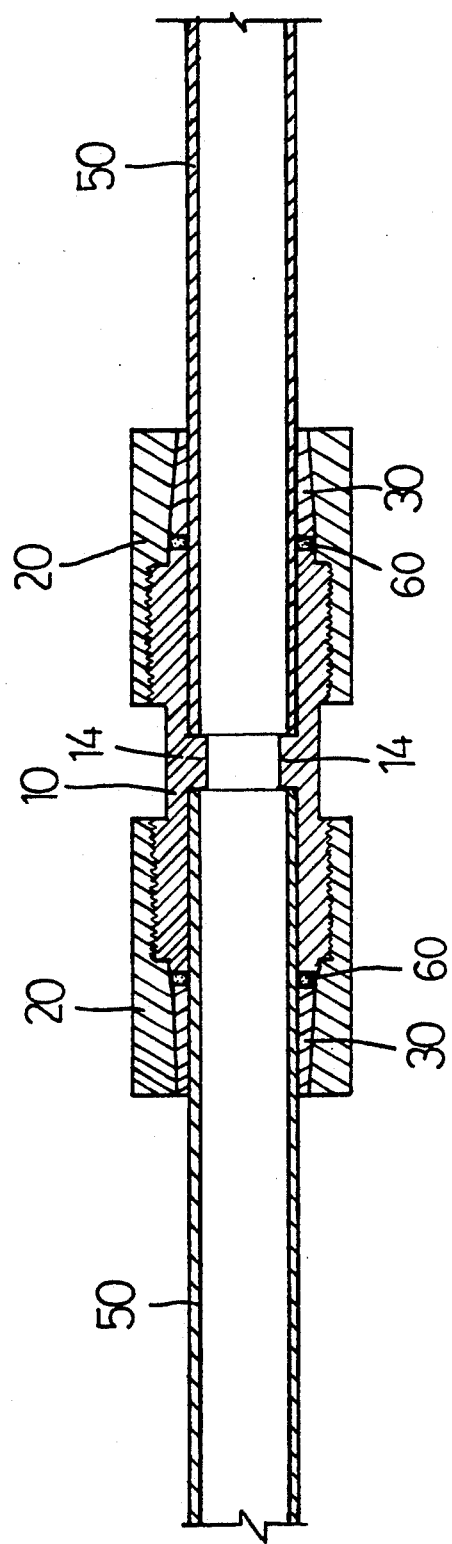
FIG. 2 is a sectional assembly view thereof taken in longitudinal direction.

Referring to FIGS. 1 and 2, a pipe connector which is constructed according to the present invention and provided for connecting two water pipes 50 together is generally comprised of a connecting tube 10, two locknuts 20, two tapered split rings 30, and two rubber seal rings 60. The connecting tube 10 has outer threads 12 around the outside surface of two opposite ends thereof, and an inward flange 14 around the inside surface thereof on the middle (see FIG. 2). The locknuts 20 are identical, having each an inner thread 22 and a taper hole 24 on the inside on two opposite ends thereof in longitudinal direction. The taper hole 24 is made gradually smaller toward the outside. The tapered split rings 30 are respectively fitted into the taper hole 24 on the respective locknut 20, having each a broken space 32 in longitudinal direction and perforations 34 over the body thereof. The tapered split rings 30 may be respective coated with a sealing glue over the outside surface thereof before use. The rubber seal rings 60 are respectively sleeved on the water pipes 50 inside the locknuts 20 and retained between either end edge 16 of the connecting tube 10 and either tapered split ring 30.

Figure 3:
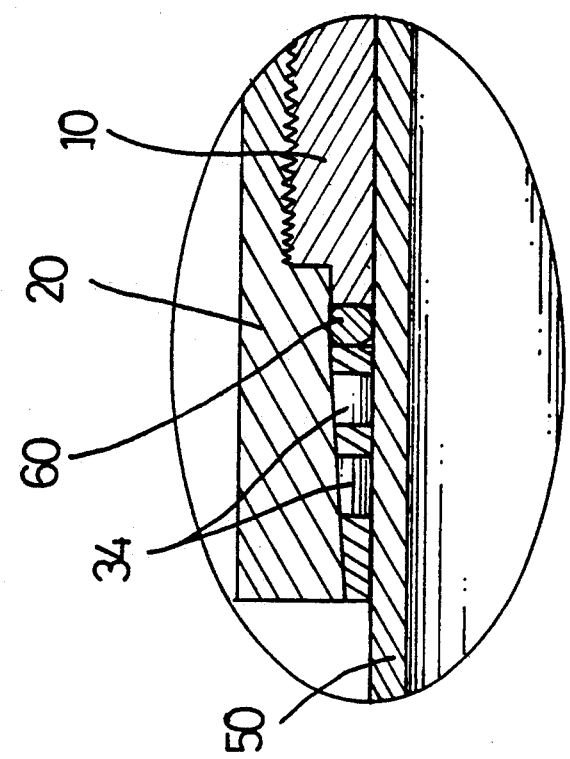
FIG. 3 is a partly sectional view in an enlarged scale showing that a rubber seal ring is squeezed between the connecting tube and a tapered split ring inside a locknut to seal the gap.
Figure 4:
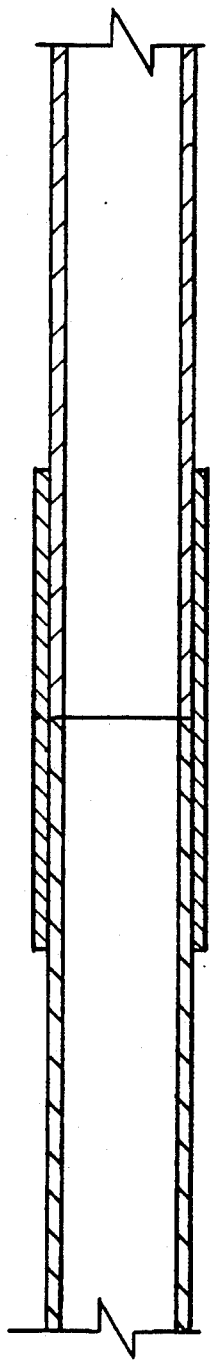
FIG. 4 is a sectional view of a structure of pipe connector according to the prior art.
Figure 6:
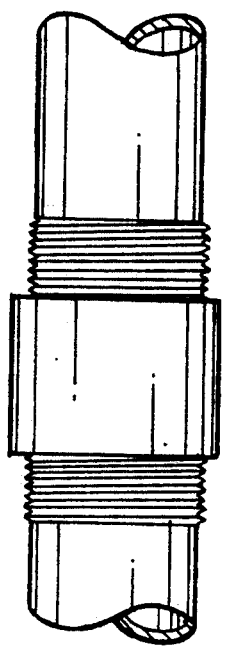
FIG. 6 illustrates still another structure of pipe connector according to the prior art.
Figure 5:
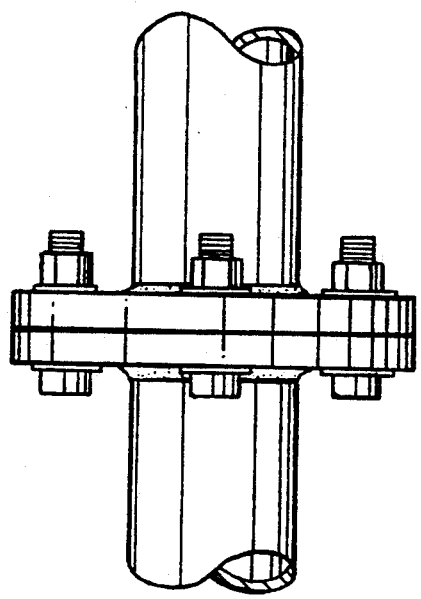
FIG. 5 illustrates another structure of pipe connector according to the prior art.

Referring to FIG. 3 and seeing FIGS. 1 and 2 again, the tapered split rings 30 are respectively inserted in the respective screw shaft bushing 20 and sleeved on the respective water pipe 50, and the rubber seal rings 60 are respectively sleeved on the respective water pipe 50, and then the locknuts 20 are respectively threaded on the outer threads 12 of the connecting tube 10 at two opposite ends causing the rubber seal rings 60 to be squeezed between either end edge 16 of the connecting tube 10 and the respective tapered split ring 30. When assembled, the water pipes 50 are respectively stopped against the inward flange 14. As the rubber seal rings 60 are squeezed, they are forced to deform, and therefore the gaps between the inside surface of the connecting tube 10 and the outside surface are effectively sealed. As the tapered split rings 30 are made with perforations 34 and coated with a sealing glue, they provide a satisfactory sealing effect and are forced to compress the water pipes 50 for carrying high pressure liquids. When squeezed by the respective locknut 20, the peripheral edge of each perforation 34 on each tapered split ring 30 tightly engages into the outside surface of the respective water pipe 50 in protecting it against high pressure liquids. Because the tapered split rings 30 are split into a broken ring by a respective broken space 32, they can be expanded or squeezed inwards in fitting different sizes of water pipes.

Referring to FIG. 3 again, the locknuts 20 have each a tapered hole 24 and an inner thread 22 on the inside in longitudinal direction, a step is formed at the connecting area between the tapered hole 24 and the inner thread 22 on each locknut 20 tight stopped against a respective step formed on the outside surface of the connecting tube 10 in front of the respective outer thread 12 to primarily seal the gaps. As indicated, the taper hole 24 on each locknut 20 is made gradually smaller toward the outside, therefore the tapered split rings 30 and the rubber seal rings 60 are continuously squeezed with increasing force as the locknuts 20 are threaded onto the connecting tube 10. The aforesaid arrangement enables the present invention to effectively eliminate leaks, and protect water pipes against high pressure liquids. The present invention is more suitable for repairing any broken water supply pipes. By cutting off the broken area of a broken water supply pipe, the separated sections of the water supply pipe can be conveniently connected together by the present invention.

What is claimed is:

1. A connector for a pair of pipe ends comprising:

a connecting tube having outer threads on two opposite ends around an outside surface, and a ring-shaped inner flange depending from an inside surface thereof and located substantially midway between the opposite ends thereof;

two cylindrical locknuts respectively threaded onto said connecting tube at the two ends thereof, each locknut having an inner thread adjacent one end and a taper hole extending from the threaded portion to the opposite end thereof in longitudinal direction, said taper hole extending to a minimum diameter adjacent an end of said tube opposite the end having the internal threaded portion, the pipe ends respectively being inserted through the respective locknut and into said respective connecting tube end and stopped against said ring-shaped inward flange on either side thereof;

two tapered split rings respectively sleeved on said pipes and fitted into the taper hole portion on each of said locknuts said split rings each having a split the length thereof and a plurality of perforations therethrough over the body of said rings and are coated with a sealing glue, each ring being tapered over the entire length thereof to a minimum diameter adjacent the minimum diameter of said respective locknut; and water seal rings respectively sleeved on said pipes and squeezed between said connecting tube and said tapered split rings.

2. The pipe connector according to claim 1 wherein said water seal rings have each a circular cross section.

* * * * *